US007975151B2

(12) United States Patent
Coenen

(10) Patent No.: US 7,975,151 B2
(45) Date of Patent: Jul. 5, 2011

(54) DECRYPTION KEY TABLE ACCESS CONTROL ON ASIC OR ASSP

(75) Inventor: Ivo Leonardus Coenen, Neuchâtel (CH)

(73) Assignee: ON Semiconductor Trading Ltd., Hamilton (BM)

( * ) Notice: Subject to any disclaimer, the term of this patent is extended or adjusted under 35 U.S.C. 154(b) by 1224 days.

(21) Appl. No.: 11/585,241

(22) Filed: Oct. 24, 2006

(65) Prior Publication Data

US 2007/0098149 A1    May 3, 2007

(30) Foreign Application Priority Data

Oct. 28, 2005 (EP) .................................. 05447241

(51) Int. Cl.
*G06F 11/30* (2006.01)
(52) U.S. Cl. .............................. 713/193; 726/2
(58) Field of Classification Search .................. 713/193, 713/1, 189, 192, 194; 714/6
See application file for complete search history.

(56) References Cited

U.S. PATENT DOCUMENTS

| | | | |
|---|---|---|---|
| 4,731,840 A | | 3/1988 | Mniszewski et al. |
| 5,421,006 A | * | 5/1995 | Jablon et al. ............... 714/36 |
| 5,499,316 A | * | 3/1996 | Sudoh et al. ............... 704/270 |
| 5,711,672 A | * | 1/1998 | Redford et al. ........... 434/307 R |
| 5,987,572 A | * | 11/1999 | Weidner et al. ............ 711/155 |
| 6,199,163 B1 | | 3/2001 | Dumas et al. |
| 6,304,970 B1 | * | 10/2001 | Bizzaro et al. ............... 726/2 |
| 6,381,732 B1 | | 4/2002 | Burnham et al. |
| 6,449,695 B1 | * | 9/2002 | Bereznyi et al. ............ 711/134 |
| 2002/0101995 A1 | * | 8/2002 | Hashimoto et al. ........ 380/277 |
| 2003/0105967 A1 | * | 6/2003 | Nam ........................... 713/189 |
| 2003/0204830 A1 | * | 10/2003 | Brawn et al. ................. 716/17 |
| 2005/0081090 A1 | * | 4/2005 | Lin ................................. 714/6 |
| 2005/0210287 A1 | * | 9/2005 | Paatero ......................... 713/201 |
| 2006/0090085 A1 | * | 4/2006 | McKenney et al. ......... 713/193 |
| 2006/0204004 A1 | * | 9/2006 | Shankar et al. .............. 380/44 |
| 2007/0067646 A1 | * | 3/2007 | Seo ............................... 713/193 |

FOREIGN PATENT DOCUMENTS

EP    0 961 193    12/1999
WO    WO 98/43431    10/1998

OTHER PUBLICATIONS

EP 0961193.*
Smith S. W. et al.: "Building a High-Performance, Programmable Secure Coprocessor", Apr. 23,1999, Computer Networks and ISDN Systems, North Holland Publishing, Amsterdam, NL, pp. 831-860, XP000700284, ISSN: 0169-7552.
Official communication received in European Patent Application No. EP05447241.0 (Aug. 19, 2008).

* cited by examiner

*Primary Examiner* — Matthew B Smithers
*Assistant Examiner* — Abu Sholeman
(74) *Attorney, Agent, or Firm* — Bacon & Thomas, PLLC

(57) ABSTRACT

An ASIC or ASSP has processor circuitry (110), a predetermined initialization program (100) for execution by the processor circuitry at power up, and a non-volatile key table (120) readable by the initialization program, and not accessible otherwise by the processor circuitry. The initialization program reads a key index associated with encrypted data, from external memory, and uses the key index to read a corresponding key from the table, to decrypt the encrypted data for use by the processor circuitry. Optionally another key is first decrypted and used for the decryption of the encrypted data. By keeping the key on board the chip and restricting access in this way, the key and therefore the encrypted data can be protected from software based reverse engineering. This means the encrypted data can cheaper memory chips or other storage. Thus the processor circuitry can be formed on a smaller integrated circuit.

18 Claims, 3 Drawing Sheets

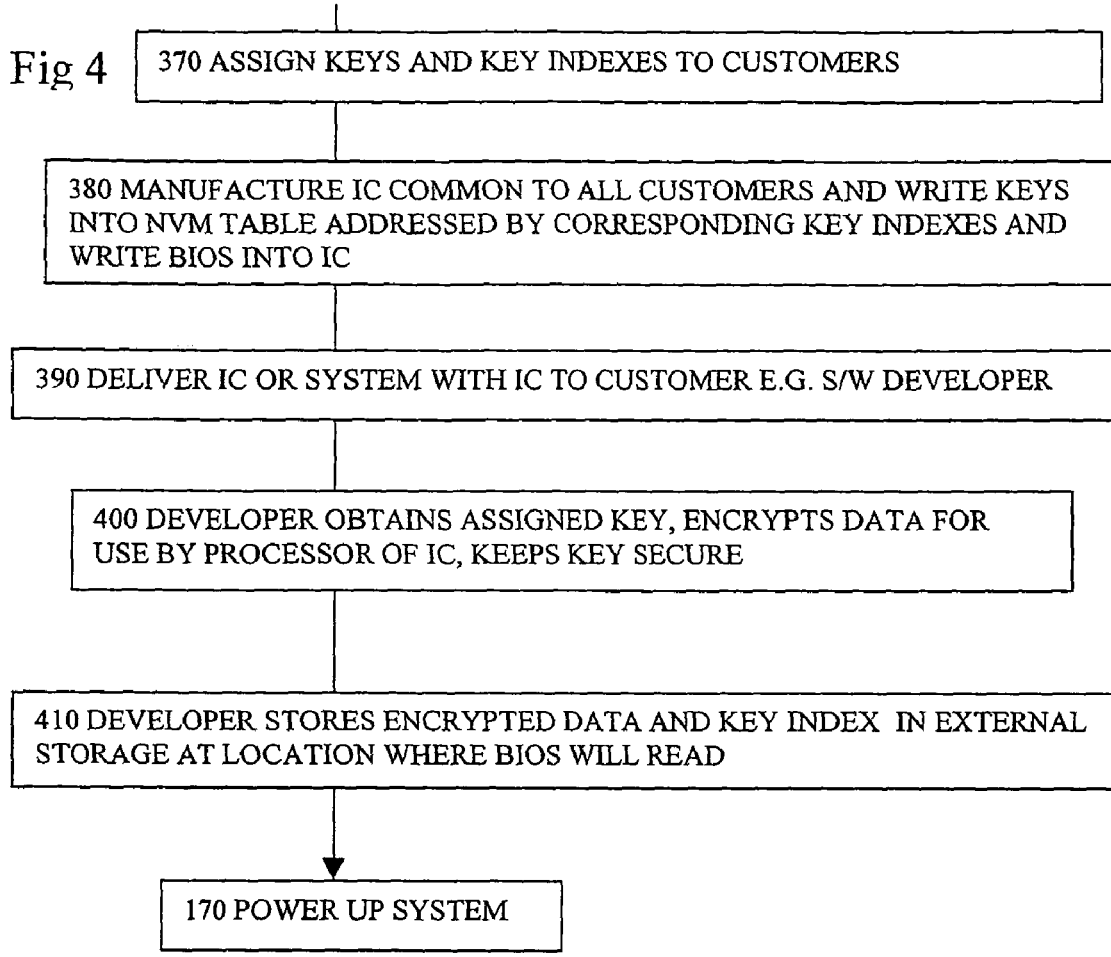

DECRYPTION KEY TABLE ACCESS CONTROL ON ASIC OR ASSP

FIELD OF THE INVENTION

This invention relates to integrated circuits such as ASICs or ASSPs, and to corresponding methods of making or using such devices, to corresponding systems and software.

DESCRIPTION OF THE RELATED ART

It is known to provide algorithms and/or software for use by an ASIC (Application Specific Integrated Circuit) device stored in a standard RAM or ROM storage device external to the ASIC so that the size of the ASIC can be kept small. However this can make it much easier to reverse engineer the algorithms and/or software by tampering with the external contacts of the RAM or ROM and reading out its contents. Thus the algorithms and/or software may need to be encrypted to prevent copying by competitors and enable selective licensing to product manufacturers or end users. To reduce unit costs by increasing production quantities, one ASIC should be designed to fit the needs of a number of different products. An Application-Specific Standard Product (ASSP), is sold to multiple product manufacturers. Each product manufacturer provides its own algorithms and/or software for execution by their own ASIC. Each product manufacturer or end user should not be able to read or use the algorithms/software except the parts for which it has been licensed. To achieve this, each part can be encrypted with a different key, and the resulting ASIC can be arranged to use the correct key to load the desired algorithms/software. Programmable non-volatile memory is often not available for the latest/smallest chip technologies, besides this would make the ASIC bigger and more expensive to produce. To create a chip that can be used by multiple product manufacturers, a solution is therefore to include multiple fixed keys in a table. This means many keys need to be managed in a key table.

Applications for this type of product include hearing aid devices where a standard hardware platform suited to the restricted space and power supply can be provided to enable various product manufacturers design their own algorithms and software for digital signal processing of sounds.

U.S. Pat. No. 6,381,732 shows a key table in an FPGA (field programmable gate array), to unlock macros. Once a user has bought a license, the user can then program the chip with the keys corresponding to the locked macros. The key table can be a memory that is write only from outside the FPGA. An on board decoder can read the key table but cannot pass the contents outside.

US Patent Application 20030105967 shows a processor having a module for encrypting an input data or decrypting an encrypted data; a key table for storing secret keys for data encryption/decryption; and a control unit for generating an index for selecting the key for the encrypting operation of the module. The memory includes: a memory cell array for storing data encrypted by the module of the processor; and a key state memory for storing the index generated in the control unit of the processor and used for the encryption of the input data. Since the purpose is to provide dynamic encryption by varying the key each time, the key index is generated by the processor rather than being read in from an external memory.

U.S. Pat. No. 4,731,840 shows encryption and decryption between a master unit and a remote unit. Each unit contains a set of key encryption keys which are indexed by a common indexing system. The master unit operates upon command from the remote unit to generate a data encryption key and encrypt the data encryption key using a preselected key encryption key. The encrypted data encryption key and an index designator are then downloaded to the remote unit, where the data encryption key is decrypted for subsequent use in the encryption and transmission data. Downloading of the encrypted data encryption key enables frequent change of keys without requiring manual entry or storage of keys at the remote unit. The method uses two keys; a data encryption key (DEK) and a key encryption key (KEK). A DEK is generated, in the manner described below, for each data transmission session. The KEK EPROM ordinarily contains approximately 200 KEK's. The KEK's are generated by any suitable pseudorandom method, and must be stored and distributed in accordance with the appropriate key management system. Since the key PROM card is essentially a permanent record of the KEK's which will be used over a period of time, it must be secured and protected at the level of sensitivity of the data. When the key PROM card is inserted into the unit, the KEK's are loaded into the RAM of the unit. A particular KEK is selected by means of a three-digit thumbwheel which selectively identifies an address in the RAM. The KEK is used to generate a DEK, which is used for subsequent data transmission during the same session. The KEK's are not used to encrypt data during ordinary communication.

U.S. Pat. No. 6,199,163 shows encryption circuit for encrypting and decrypting data as it travels to and from a hard disk. The encryption circuit can be turned on or off under control of a BIOS program and a user supplied password. This is described as a development of BIOS based password protection in which a BIOS based password program runs before control of the computer is given to any disk based software. This prevents an unauthorized user from accessing data by starting the computer from a floppy disk or using other means to change the disk based software. While BIOS based security software is better than disk based security software, it still does not protect data removed from the computer. Hence the proposal to encrypt data on the hard disc. The BIOS is used to compare a password on the hard disc with a power on password entered by a user. Later, a user is prompted for a separate hard disc password to access encrypted data on the hard disc. So some decryption appears to take place under control of the BIOS before normal boot up. The password is used for encrypting or decrypting. It is stored in a register in the encryption circuit, but this is a non-volatile register.

SUMMARY OF THE INVENTION

An object of the invention is to provide improved integrated circuits such as ASICs or ASSPs, and to corresponding methods of making or using such devices, to corresponding systems and software. According to a first aspect, the invention provides: An integrated circuit having processor circuitry, a predetermined initialization program for execution by the processor circuitry at power up, and a non-volatile store readable by the initialization program, and not accessible otherwise by the processor circuitry, the initialization program being arranged to read a key index associated with particular encrypted data, and to use the key index to read a corresponding key from the non-volatile store, the corresponding key being suitable to decrypt the particular encrypted data for use by the processor circuitry or to decrypt a decryption key which will then be used to decrypt data for use by the processor circuitry. Using an intermediate key strengthens the security of any real security key (e.g. one located in an on chip key table) in several ways, thus making the number of available keys in the ASIC or ASSP last longer. An advantage is that a user does not have to supply a key to employees as they can work with a key generated from the first key, this generated key being encrypted with the real security key and the index of the real security key. For each of it's products the user can then generate different keys, so that if the security of one of the keys is breached, then only the software of one product is breached. An employee or ex-employee can therefore only be able to know the key of a product he/she worked with. Another advantage is that there will be less encrypted data of the same key available, which makes it harder to crack the security key. Some encryption algorithms become weaker when there is more encrypted data available. This is generally even more the case when there is "known plain-text" available. For example, the start or some other part of the encrypted code could very well be the same on all products, e.g. some helper code or library, and thus act as "known plain-text" for an attack.

Also, by keeping the key on board the chip and not accessible generally to the processor circuitry, the key and therefore the encrypted data can be protected from software based reverse engineering based on reprogramming the processor circuitry. This means that some or all of the encrypted data can be stored off chip, and thus make use of much cheaper and more highly integrated memory chips or other storage. Thus the processor circuitry can be formed on a smaller integrated circuit. This is particularly cost effective for integrated circuits using technologies suitable for ASICs, in which storage cells are typically larger and more expensive than dedicated memory devices, and for applications using large programs.

In addition, using a single private/public (asymmetrical) encryption key pair is a solution that requires additional hardware surface and/or long startup times of the chip. In accordance with an aspect of the present invention using a symmetrical encryption algorithm allows fast decryption/startup with no additional hardware surface costs. Both chip size and startup times are therefore improved. An additional feature for a dependent claim is the non-volatile store being a read only memory or a "write once read many memory". For example, the key can be fixed at the time of manufacture of the integrated circuit, which can protect against tampering subsequently.

Another such additional feature is the non-volatile store having a number of keys, each having a corresponding key index.

Another such additional feature is the initialization program being arranged to read in the key index from an external location. The location may be at a predetermined address. Alternatively, the external location can be header data in the external store or some sore of file allocation table located in the external store.

Another such additional feature is key table gate circuitry arranged to allow key read operations by the initialization program and then prevent further access until the next power up. The number of allowed key read operations may be limited to a predetermined number.

Another such additional feature is the integrated circuit being arranged to carry out the decryption on board. Another such additional feature is the decrypted data having executable code, and the processor circuitry being arranged to execute the code.

Another such additional feature is the processor circuitry comprising a digital signal processor. The integrated circuit can have analog signal inputs and analog to digital conversion circuitry. The encrypted data can comprise digital signal processing algorithms.

Another such additional feature is the integrated circuit being an ASIC.

Another such additional feature is a system having the integrated circuit and an external storage device coupled to the integrated circuit, for storing the encrypted data and the key index. Optionally, the encrypted key, which has been used to encrypt the data in the storage device, can also be stored.

Another such additional feature is the external storage device being rewritable.

Another such additional feature is the system having an interface to enable rewriting of the external storage device from another system.

Another aspect provides a method of manufacturing the integrated circuit set out above, having the steps of assigning a number of secure keys and their corresponding key indexes to each of a number of customers, and manufacturing a common integrated circuit for those customers the secure keys being stored in the non-volatile store, e.g. read only memory so as to be accessible using their corresponding key index.

Another aspect provides a method of customising the system set out above, the method having the steps of obtaining a secure copy of the key and of its corresponding key index, encrypting data according to the key, for use by the processor circuitry of the system, storing the encrypted data and the key index in the external storage device of the system, such that on power up of the system, the key index can be accessed by the integrated circuit and the encrypted data can be read by the integrated circuit, and decrypted and used by the processor circuitry.

Any of the additional features can be combined together and combined with any of the aspects. Other advantages will be apparent to those skilled in the art, especially over other prior art. Numerous variations and modifications can be made without departing from the claims of the present invention. Therefore, it should be clearly understood that the form of the present invention is illustrative only and is not intended to limit the scope of the present invention.

BRIEF DESCRIPTION OF THE DRAWINGS

How the present invention may be put into effect will now be described by way of example with reference to the appended drawings, in which:
FIG. 4 shows steps according to other embodiments.

DESCRIPTION OF THE PREFERRED EMBODIMENTS

The breadth of the claims of this invention is not limited to the embodiments explicitly disclosed. Any reference signs do not limit the scope of the claims. The word "comprising" does not exclude the presence of other elements or steps than those listed in a claim. Use of the word "a" or "an" preceding an element does not exclude the presence of a plurality of such elements.

The present invention relates to integrated circuits such as ASICs or ASSPs, and to corresponding methods of making or using such devices, to corresponding systems and software. The embodiments can help prevent software based reverse engineering access to keys, and thus protect the data which can contain valuable or sensitive information, or represent valuable intellectual property. Some embodiments show using an initialization program such as a BIOS to control access to an on chip non-volatile key table. In some embodiments the "key table gate" enables the BIOS to read a key from a table after start up, then prevents access until the next start up. This protects the key table from being accessed by any other software. An aim is to enable multiple clients to use the same ASIC or ASSP, and be able to each use their own encrypted data or program, stored externally so that non-volatile memory need not be provided on chip. Some embodiments involve providing the keys to each clients' encrypted data or program in a ROM on chip, the keys being accessible only by the BIOS.

Figure 1:
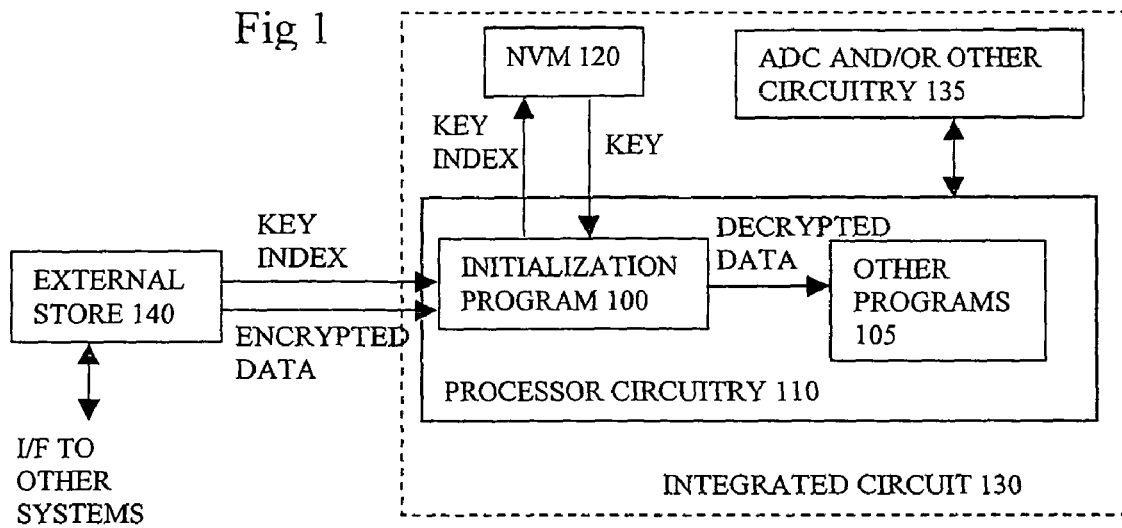
FIG. 1 shows an embodiment of the invention.

FIG. 1 shows in schematic form a system having an integrated circuit 130 and an external store 140. The integrated circuit can be an ASIC, ASSP or other circuitry, and has processor circuitry 110, a non-volatile memory part 120, and ADC and/or other circuitry 135. The processor circuitry has an initialization program 100 such as a BIOS, and other programs 105.

On start up, the BIOS reads a client key number from the external store 140, and uses this to retrieve that client's key from the on chip key store. A client can have many keys each for a different program for example. The BIOS then disables access to the on chip key store permanently until the next start up. The BIOS then reads the encrypted data or program, and decrypts it on chip. According to some embodiments the decrypted data is kept within the chip. This means that if a third party buys a product including the integrated circuit and external store, and powers up the device and discovers the key number in the external store, the decrypted data or program is kept within the chip and so is not revealed without expensive reverse engineering of the internals of the chip. Access to the inside of the chip, including it's memories which contain the decrypted data, is in this situation extremely difficult or not possible from the outside. To enable access to the inside of the chip preferably an "unlock" procedure is executed which will erase every trace of the decrypted data and the key data. The decrypted data can be used by the other programs, or the data can be a program for execution by the processor circuitry for example. The processor circuitry can be a general purpose processor, or more specialized digital signal processing circuitry for example.

The external store can be a conventional RAM or ROM chip, EEPROM or any other type of memory device, such as a magnetic or optical disc for example. It can be rewritable and can have an interface to other systems to allow software development and encryption on a desktop PC for example followed by download to the external store. A link can be provided between the PC and the chip. Downloading to the external store is then done with the chip as an intermediate.

Figure 2:
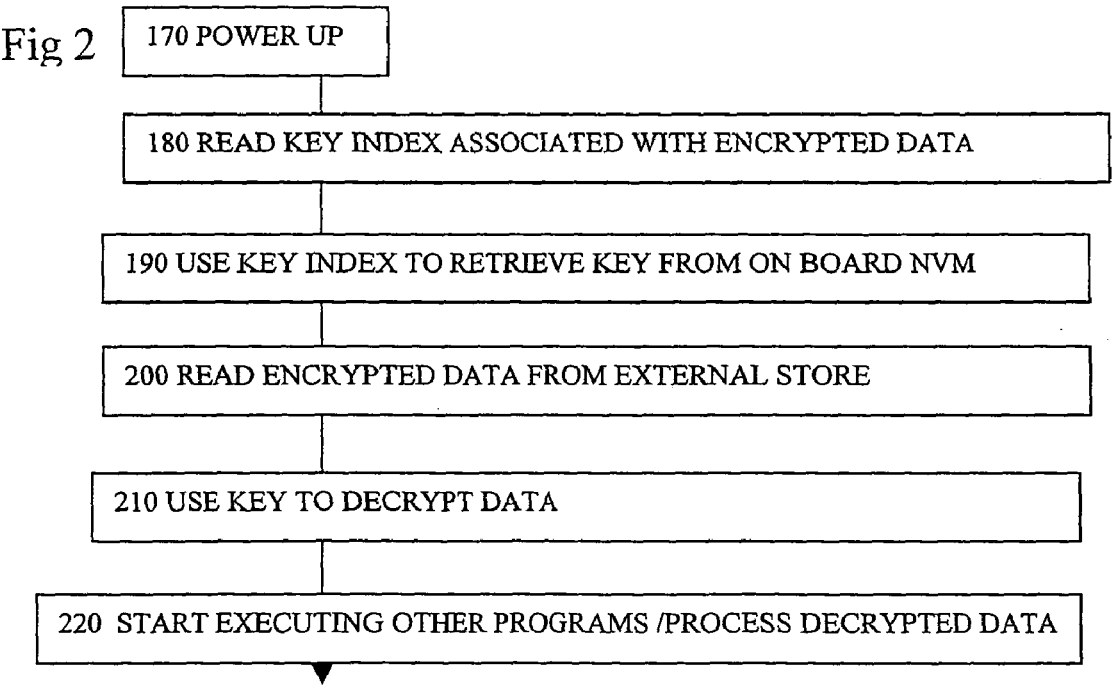
FIG. 2 shows steps according to an embodiment.

FIG. 2 shows some of the principal steps according to an embodiment using the system of FIG. 1, or using other embodiments. At step 170, the system is powered up, which causes the initialization program to be run. This may have many conventional functions including testing memory and other circuitry, and setting up registers, defaults and initializing circuitry. At step 180, the initialization program reads a key index from a predetermined location which may be on chip, or from the external store, or any other location in principle. At step 190, the key index is used by the initialization program to retrieve the corresponding key from the NVM 120. The key index can be a large number or lengthy character string so that it is difficult to guess it, or test all possible numbers, to improve security. At step 200, the encrypted data is read in to the chip by the initialization program, and the key is used at step 210 to decrypt the data. The data to be decrypted may comprise one or more programs. There may be unencrypted data which are downloaded to the chip at the same time, to suit the application. Preferably, unencrypted data only includes real data, like configuration parameters. Preferably, no program data should be unencypted, as these can be changed (and executed on the chip) without knowing the encryption key.

The above can reduce the need for expensive NVM on the same chip as the processor. At step 220, the access to the key table is disabled and optionally the decrypted data is checked to be valid, for instance using an error detection or correction code such as a CRC. This will avoid any security breach by tampering with the encrypted data. The initialization program then starts other programs or processes the decrypted data for example.

Figure 3:
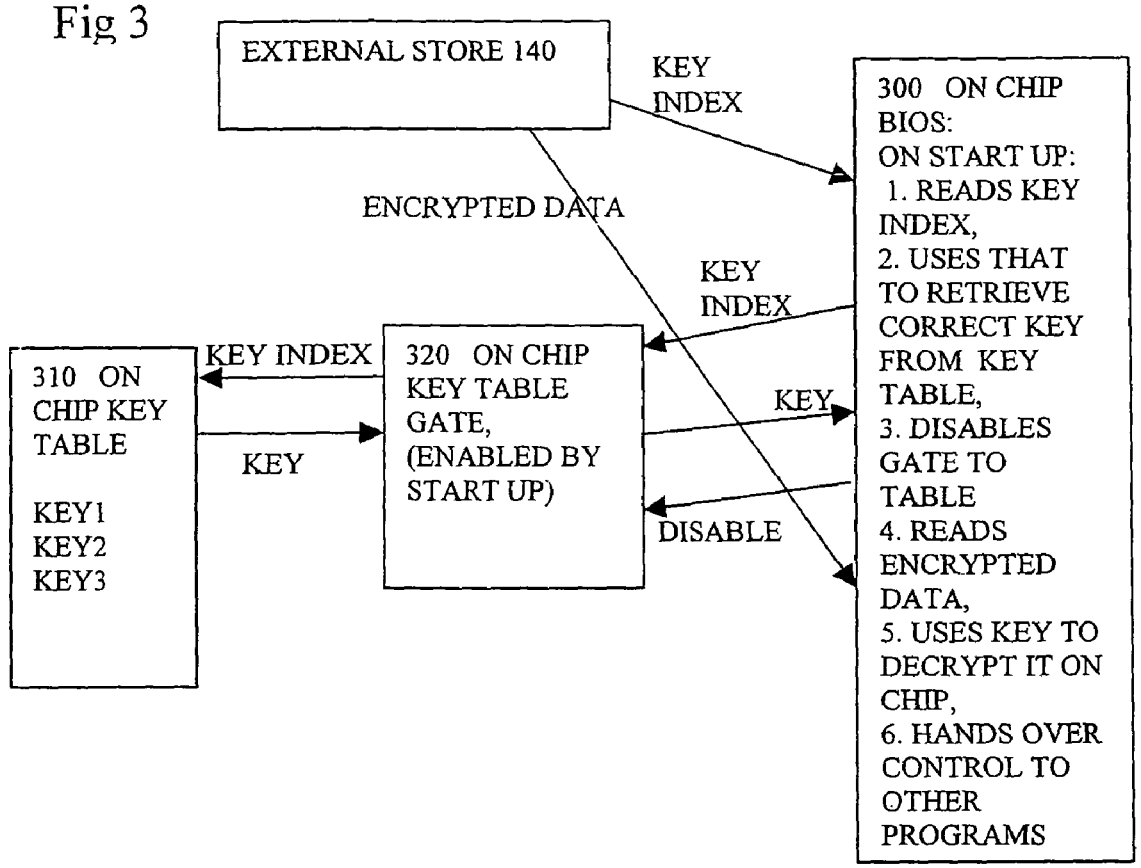
FIG. 3 shows another embodiment.

FIG. 3 shows a schematic view of another embodiment. In this case, the on chip BIOS 300 is shown coupled to an on chip key table 310 via an on chip key table gate 320. Arrows show the movement of items between these elements and from the external store 140. The on chip BIOS can be executed by any type of processing circuitry. Some of the principal steps carried out by the BIOS are shown in the figure. In step 1, after power up, the BIOS reads in the key index from the predetermined location in the external store 140. The BIOS then passes the index to the key table 310 via the key table gate 320. The key table returns the corresponding key, if the key index is a valid number or character string. An optional check is whether the key index is in a valid number range. The key is then obtained by reading it directly from the key table. This access is controlled by the gate.

The key table gate can now be disabled by the BIOS at step 3. The key table gate can be arranged to be disabled by any suitable means such as a message from the BIOS, or writing at a certain address in memory, or it could be arranged to allow a predetermined number of accesses by the BIOS after which it then disables itself until the next power up. This can be implemented in the form of a control register. After copying the key, before any user code can be executed by the processor, this control register that controls access to the key table is set by the BIOS. This control register can be set but not be reset except by the power-on reset. This may be done in hardware. For instance, the output of a logical OR gate can be connected, which combines the register output value with the new input value, to the input of the register. This enables the key table to be protected from the on chip processor system which can be user programmable.

The BIOS then reads in the encrypted data from the external store or any location, in principle, at step 4, and uses the key at step 5 to decrypt the data keeping it on chip. The decryption can be part of the BIOS or can be done with a dedicate decryption circuit in hardware, for example. The decrypted data can then be used by the processor, and the BIOS hands over control to other programs. Optionally, a check can be made if the decrypted data is valid before executing it. For example the data may be protected by error detection or error correction mechanisms. If the data is found to be corrupted an option is to reset the system and start over.

FIG. 4 shows steps for methods of manufacturing the ICs or systems, and methods of customizing the systems. A first step is assigning keys and key indexes to customers, at step 370. At step 380, the IC is manufactured to be common to many or all customers. At the time of manufacture, the keys are created in the table at addresses corresponding to the key indexes for each key. Although one option is that when the chip is manufactured the keys are created as part of the chip, the keys could also be written into the table if another type of non-volatile memory then a ROM is used for the key table, e.g. such as a write-once memory. The BIOS is also created or generated at this stage, in code executable by the processor circuitry, and preferably in a form which is hard wired and cannot be modified later. At step 390, the manufactured IC or the system containing the IC is delivered to the customer, e.g. a software developer. If an ASIC or ASSP, the manufacturing may include defining the ASIC or ASSP design in the chip. At step 400, the developer obtains the key or keys assigned to them, perhaps by paying a license fee. A single private/public (asymmetrical) encryption key pair is a less preferred solution as it requires additional hardware surface and/or long startup times of the chip. In accordance with an aspect of the present invention a symmetrical encryption algorithm is used as this allows fast decryption/startup with no additional hardware surface costs. Both chip size and startup times are therefore improved. The user uses the key to encrypt relevant data such as programs for use by the IC. These can be for example programs having algorithms for digital signal processing. Each developer can develop their own software. The developer keeps their key secure, but downloads the encrypted program into the external store of the system for delivery to the end user.

In an alternative embodiment the above procedure can be done the other way around. For example, keys are randomly generated and an on chip ROM is created containing these keys at the manufacturing stage. A customer can work/develop/use the chips without knowing any key. When the customer wants to protect the software/data that he created for his product, then he can obtain a key and it's index number. He can encrypt his data with this key. Alternatively, the customer can encrypt the data with a further key that he generates himself and then only encrypts this key with the obtained key.

The key index is also stored in the external storage, at a location where the BIOS will read. The system can then be powered up at step 170, either for testing and software development, or in the field following delivery to an end user. Such power up can lead to the steps shown in FIG. 2 for example. Many different encryption methods can be used, an example is a symmetrical encryption algorithm (for example the well known AES, Advanced Encryption Standard) which will add a startup delay which is still acceptable in many applications.

As described above, some embodiments involve the steps of:

Generating a fixed key table with an index,

Assigning a key to a customer, giving the key and its index number to that customer. Customer's data is encrypted with the key and stored with the index.

Reading the index, indexing the key table with that index and retrieving the corresponding key, Using the key to decrypt customer's encrypted data, and/or Using the key to decrypt the customer's own encryption key, and/or Using the decrypted customer's encryption key to decrypt the customer's encrypted data.

Or the use of apparatus as follows:

A device having a processor able to execute code, that contains an indexed key table.

The key table contains a predetermined number of keys whereby each key can be assigned to a different customer, each such customer being assigned a number used to index the key table.

In particular, the key table is in a read only or write once memory associated with the device, i.e. is thus "fixed" during manufacture.

The device fetches the code it will execute from an external memory where customer specific encrypted data are stored together with the customer specific key number/index In particular, the device is set-up by a BIOS that cannot be modified, The BIOS reads the customer specific data and the key number The BIOS fetches the customer specific key in the key table and triggers the decryption of the customer specific data. Alternatively, this step may include decrypting a key generated by the customer, which will be used to decrypt the customer specific data.

In particular, the BIOS is the only "agent" able to access the key table

In particular the device can be an ASIC/ASSP or similar.

Notably, compared to known arrangements, encryption is done by customer, not by the device itself. Configuration data or logged information that could be used for maintenance, could also be encrypted and stored in the external store by the device itself, if the customer programs the device to do so. The key index is predetermined, it is generated and fixed during manufacture not by the device. A BIOS fetches the key index and decrypts the data (using a programmable device, e.g. the on chip processor) instead of hardwired circuitry under the control of a processor that could be "hijacked" by third party software. As an option it is also included within the scope of the present invention to use a decryption circuit in hardware to speed up the decryption process. The encrypted data can include code that will be executed by the device, e.g. program code. The present invention is not limited to encrypting code that will be executed but rather can also include other data, e.g. non-executable code.

The processor circuitry and other parts can be implemented using logic circuitry or other digital hardware for example following established practice. The IC can use any conventional ASIC technologies, or be implemented as a hybrid of different technologies for example. The initialisation program and processor can be implemented as hard wired logic or other circuitry separate from another processor used for other functions on the IC, if desired. Other variations within the claims and other advantages can be envisaged by those skilled in the art.

The invention claimed is:

1. An integrated circuit having processor circuitry, a predetermined initialization program for execution by the processor circuitry at power up, and a non-volatile store readable by the initialization program, and not accessible otherwise by the processor circuitry, the initialization program being arranged to read a key index associated with particular encrypted data, and to use the key index to read a corresponding key from the non-volatile store, the corresponding key being suitable to decrypt the particular encrypted data for use by the processor circuitry or is suitable for a customer defined encryption key to be decrypted, which customer defined encryption key is then used to decrypt the encrypted data, the initialization program being further arranged to disable access to the non-volatile store until the next power up after having allowed a predetermined number of accesses to the non-volatile store.

2. The integrated circuit of claim 1, the non-volatile store being read only memory.

3. The integrated circuit of claim 1, the non-volatile store having a table having a number of keys, each having a corresponding key index.

4. The integrated circuit of claim 1, the initialization program being arranged to read in the key index from an external location.

5. The integrated circuit of claim 4, wherein the key index is located at a predetermined address.

6. The integrated circuit of claim 1, having key table gate circuitry arranged to allow a number of key read operations by the initialization program and then prevent further access until the next power up.

7. The integrated circuit of claim 1, the processor circuitry being arranged to carry out the decryption on board.

8. The integrated circuit of claim 7, wherein the processor circuitry is arranged to carry out the decryption on board using, partly or completely, a decryption block in hardware or using any other kind of on board co-processor.

9. The integrated circuit of claim 1, the decrypted data having executable code, and the processor circuitry being arranged to execute the code.

10. The integrated circuit of claim 1, the processor circuitry comprising a digital signal processor.

11. The integrated circuit of claim 1, having one or more analog signal inputs and analog to digital conversion circuitry.

12. The integrated circuit of claim 1, the encrypted data comprising digital signal processing algorithms.

13. The integrated circuit of claim 1, comprising an ASIC or an ASSP.

14. A system having the integrated circuit of claim 1 and an external storage device coupled to the integrated circuit, for storing the encrypted data and the key index.

15. The system of claim 14, the external storage device comprising rewritable storage.

16. The system of claim 14 having an interface to enable rewriting of the external storage device from another system.

17. A method of manufacturing the integrated circuit of claim 1, having the steps of assigning a number of secure keys and their corresponding key indexes to each of a number of customers, and manufacturing a common integrated circuit for those customers by storing the secure keys in the read only non-volatile store so as to be accessible using their corresponding key index.

18. A method of customizing the system of claim 14, the method having the steps of obtaining a secure copy of the key and of its corresponding key index, encrypting data according to the key, for use by the processor circuitry of the system, storing the encrypted data and the key index in the external storage device of the system, such that on power up of the system, the key index can be accessed by the integrated circuit and the encrypted data can be read by the integrated circuit, and decrypted and used by the processor circuitry or a customer defined encryption key is decrypted, which customer defined encryption key is then used to decrypt the encrypted data.

* * * * *